UNITED STATES PATENT OFFICE.

FRANK SKALLA, OF NILES, MICHIGAN.

PROCESS OF MOLDING A COMPRESSED FIBER COMPOSITION.

1,168,831.  Specification of Letters Patent.  Patented Jan. 18, 1916.

No Drawing.  Application filed January 23, 1915.  Serial No. 4,018.

*To all whom it may concern:*

Be it known that I, FRANK SKALLA, a citizen of the United States, residing at Niles, in the county of Berrien and State of Michigan, have invented new and useful Improvements in Processes of Molding a Compressed Fiber Composition, of which the following is a specification.

My invention relates to a novel and improved process of making a compressed fiber composition for use in the manufacture of various objects, such as bowling pins and balls, stool and closet seats, pool balls and various other objects commonly made of wood or composition materials, the object of the invention being to provide a process of manufacture whereby a wood fiber composition of great strength and durability may be produced at a comparatively low cost.

In carrying my invention into practice, I employ as a body material wood fiber, in the form of sawdust, shavings, chips, or other kinds of comminuted or suitably reduced wood, of the same or different species. This wood, in the proportions hereinafter named, is mixed with an adhesive solution, the mixture dried until, from a wet condition, it is reduced to the state of a granular mass, which is damp and slightly adhesive, and plastic when squeezed in the hand or otherwise subjected to pressure, the dried mass then moistened, and the mass finally subjected to the action of heated dies or to pressure in a mold.

The adhesive employed may consist of glue mixed with about eight times its weight of water to produce a thin solution or it may consist of shellac, liquid glass, or rosin cut down with a suitable solvent, a solution of glue and water, however, being preferably employed where economy of manufacture is a paramount consideration. This adhesive or glue solution, in the proportion of nine parts or nine pounds, is mixed with one-half its weight, say four and one-half parts or pounds, of wood in the form of sawdust, shavings or a suitable mixture of sawdust and shavings or wood in other comminuted form. This mixture is then dried until its weight is brought down to between six and seven pounds, the mixture at this stage being of the consistency of a plastic mass which is damp and feels slightly adhesive when squeezed in the hand.

The plastic mixture thus prepared is then mixed with about 1 pound or sixteen fluid ounces of the solvent employed, which is allowed to thoroughly permeate it, so that the glue or adhesive mixture, a large proportion of which has been absorbed by the comminuted wood, will be spread evenly and uniformly throughout the mass of the wood to coat the surfaces thereof. The plastic composition is then ready for use for the production of the desired article, the process being completed by subjecting the composition to a pressure of about two thousand pounds per square inch in a mold or between heated dies, then allowing the formed article to set and thoroughly harden and thereafter removing the same.

The improved composition may be employed in the manufacture of bowling balls and pins, pool balls, stool and closet seats, and various other articles commonly made of wood, and which must possess to a high degree strength, durability and elasticity. The composition not only produces an article which possesses all these desirable qualities, but which at the same time requires no turning, sawing, or other finishing, otherwise than slight smoothing and varnishing or other surface coating, after it has been formed in the mold or by the action of the hot dies. Furthermore, the composition is comparatively simple and inexpensive of production and ornamental in appearance. It possesses much greater strength and durability than fibrous compositions of a similar character which are combined and pressed in the usual way, since by the steps of drying and remoistening prior to the step of subjecting the mass to pressure the glue or adhesive is more thoroughly combined with the wood and the particles of wood more thoroughly and homogeneously bound together so as to produce an article of maximum strength and durability. This action of distributing the adhesive throughout the mass is promoted by the action of the heated dies, which drive off the moisture, open the pores of the wood for the saturation of the wood by the adhesive, and retaining sufficient heat after the driving off of the moisture to keep the adhesive in a plastic condition until the fibers are thoroughly saturated and combined.

I claim:—
1. The herein described process of mold- ing a fibrous composition, which consists in making an adhesive solution consisting of a suitable adhesive and a solvent, then mixing said adhesive with comminuted wood, to produce a wet coherent mass, then subjecting the mass to a drying action until the major portion of the solvent is driven off, leaving the mass in a slightly adhesive, moist and plastic granular condition, then remoistening the mass with the solvent, and then subjecting the mass to the action of heating dies.

2. The herein described process of molding a fibrous composition, which consists in preparing an adhesive solution of glue, one part, and water, eight parts; mixing the adhesive solution with comminuted wood, in the proportion of a suitable amount of the adhesive to about one-half its weight of wood, so as to form a wet coherent mass, then drying the mass until reduced to a plastic consistency and slightly adhesive under pressure, while still preserving its coherency, then moistening the mass with water, and then subjecting the mass to the action of hot dies under heavy pressure.

In testimony whereof I affix my signature in presence of two witnesses.

FRANK SKALLA.

Witnesses:
ARTHUR J. HILLMAN,
MAYME B. BRAHANEY.